United States Patent [19]

Cawley

[11] Patent Number: 4,858,750
[45] Date of Patent: Aug. 22, 1989

[54] CONVEYORS
[75] Inventor: Keith Cawley, Coltishall, England
[73] Assignee: Lineal Thermotech Limited, Norwich, United Kingdom
[21] Appl. No.: 185,774
[22] Filed: Apr. 25, 1988

[30] Foreign Application Priority Data

May 9, 1987 [GB] United Kingdom ............... 8711022
May 9, 1987 [GB] United Kingdom ............... 8711023

[51] Int. Cl.$^4$ ............................................. B65G 21/18
[52] U.S. Cl. .................................................... 198/778
[58] Field of Search ................ 198/778, 848–853, 198/328

[56] References Cited

U.S. PATENT DOCUMENTS 3,938,651 2/1976 Alfred et al. ...................... 198/778
4,450,953 5/1984 Le Cann et al. ................... 198/778
4,565,282 1/1986 Olsson et al. ...................... 198/778
4,603,776 8/1986 Olsson ............................... 198/778
4,741,430 5/1988 Roinestad ......................... 198/778

Primary Examiner—Robert J. Spar
Assistant Examiner—Lyle K. Kimms
Attorney, Agent, or Firm—Edwin D. Schindler

[57] ABSTRACT

A conveyor having a conveyor belt, preferably of flexible steel mesh, constrained to conform to a helical conveyor path in which the tiers of the helical path are arranged one above the other with a minimum vertical spacing appropriate to the product to be conveyed, wherein the tiers on the outside of the helix are supported by a fixed helical guide and on the inside of the helix the tiers are self-supporting, one tier being supported by the tier underneath by an arrangement of upstanding spacer plates mounted to articulated links which define or support the inner longitudinal edge of the conveyor belt.

7 Claims, 5 Drawing Sheets

CONVEYORS

FIELD OF THE INVENTION

This invention relates to a conveyor and more particularly to a conveyor of the kind which comprises an endless belt arranged to convey a product in a helical path consisting of a number of superimposed helically extending tiers.

BACKGROUND OF THE INVENTION

A known conveyor of the above kind comprises a conveyor belt having links on each side thereof, i.e. at the inside and outside of the helical conveying path, which are formed as spacers serving to support one helically extending tier above the tier immediately below. In this known conveyor, a supplementary conveyor belt is employed to drive the lowest tier of the stack thereof.

Disadvantages which arise with the known conveyor are a possible deficiency in mechanical strength (as compared to a spiral conveyor driven throughout its height by an internal drum or capstan) and the inability to gain access to the product being conveyed at an intermediate point in the helical conveying path. However, the above-described known arrangement has the advantage of being compact in the vertical direction, i.e. in the height of the stack relative to the length of the conveying path.

It is an object of this invention to provide a helical conveyor system which, substantially without loss of the afore-mentioned compactness, at least materially reduces the stated disadvantages of the known arrangement.

SUMMARY OF THE INVENTION

According to the present invention, there is provided an endless conveyor having a conveyor belt a portion of the length of which is caused to follow a helical conveying path consisting of a plurality of tiers stacked on top of one another, wherein the conveyor belt on the outside of the helix is supported by a fixed helical guide, and at the inside edge of the conveyor belt the tiers are supported one on the other by an arrangement which includes articulated links at least some of which are equipped with spacers in the form of upstanding plates the tops of which at any one tier engage the underside of the links or plates associated with the next tier above, and the said inside edge of the conveyor is driven from an internal drum or capstan.

The conveyor belt is preferably driven by the internal drum or capstan through a friction coupling permitting slippage.

The slipping drive enables the endless conveyor belt to be a flexible mesh steel belt of the type referred to herein as the Ashworth-type, such as the "Omniflex" belt manufactured by Ashworth Bros. Inc. This type of belt is intended to be driven under relatively low tension, or more specifically, a tension not exceeding a certain threshold, which can be ensured by the slippage permitted by the drive, independently of the length of the helical conveying path.

In one arrangement, the conveyor belt on the inside edge of the conveyor is driven from the drum or capstan through a supplementary conveyor provided with said articulated links equipped with spacer plates. In this case the supplementary conveyor is preferably driven at the speed of rotation of the internal drum or capstan, and the endless conveyor is friction driven by the supplementary conveyor with a degree of slippage.

In an alternative and preferred arrangement, the longitudinal edge of the conveyor belt at the inside edge of the helix is formed with said articulated links equipped with spacer plates.

In the preferred arrangement, the upstanding spacer plates may be incorporated during manufacture of the belt, preferably an Ashworth-type belt as referred to above, or these plates may be separately produced and adapted for attachment to the one longitudinal edge of the belt as a separate production step. Moreover, while the tops of the spacer plates may engage the undersides of the articulated links in the tier above, it is preferable for the upstanding part of the plates to be disposed on the outside of the articulated links, i.e. nearer the centre line of the belt, leaving these links free for engagement with the internal drum or capstan so that the slipping drive can be imparted to the belt in a conventional manner.

The Ashworth-type conveyor belt is sufficiently flexible to be guided in a relatively direct path from the top of the helical conveying path to the bottom thereof. The upstanding spacer plates are connected, or are adapted to be connected, to the conveyor belt in such a manner as not to affect his flexibility.

The bottom tier of the conveyor belt, at the inside of the conveyor belt helix, may conveniently be supported by an inclined circular supporting surface, possibly equipped with rollers to enable free running of the inner edge of the bottom tier of the conveyor belt thereover, although in some circumstances a sliding support will be sufficient.

The conveyor of the invention is more especially intended for conveying a product, such as a food product, within a confined space within which the product is to be treated, e.g. by heating, drying, chilling or, more especially, freezing. Accordingly, the spacing between the tiers of the helical conveying path is predetermined to suit the dimensions of the product to be treated, as also is the width of the endless conveyor belt. On the outside of the helix, the helical guide is formed to match the helical conveying path required. On the inside of the helix, the spacing plates are selected to be of a height to suit the required tier spacing, and it may therefore be advantageous for these plates to be attached to the conveyor belt as a separate operation, so that manufacture of the Ashworth-type belt itself can remain a standardised procedure.

One of a number of possibilities for the shape of the upstanding spacer plates is an upstanding limb and at least one transverse limb at the top extending at right angles to the upstanding limb towards or away from the centre line of the conveyor belt. The transverse limb may project inwardly, i.e. towards the inside longitudinal edge of the conveyor belt, in order to support the underside of a link in the tier above. Alternatively, a generally L-shaped plate may be employed in a non-inverted orientation, with the upstanding limb slightly inclined towards the centre line of the belt so that its upper edge cooperates with a groove or analogous shaping represented on the underside of the transverse limb of a spacer plate in the tier above. However, in the preferred arrangement, each spacer plate has two transverse limbs at the top of the upstanding limb, one projecting towards the centre line of the conveyor and one away from the centre line, the said two transverse limbs being non-aligned along the length of the conveyor belt. Preferably, considering any two adjacent spacer plates, the upstanding limbs, together with the adjacent but oppositely directed transverse limbs of the respective plates at the tops of the upstanding limbs, overlap in the direction of the length of the conveyor.

The conveying system in accordance with the invention has the advantages of mechanical strength imparted by the internal drum or capstan, of a uniform internal friction drive throughout the height of the conveying path, and the facility for access to the conveyed product, between the turns of the helical guide on the outside of the helix, at any point in the helical conveying path. In addition, the structure of the conveying system enables an improved air flow past the product being conveyed, between the tiers of the helical guide on the outside and the spacers of the conveyor belt on the inside. On the inside, the spacers can be apertured in order to assist free flow of air at the inside of the helical conveying path.

Whatever constructional shape of spacing plate is employed, attachment to the belt is of a kind which, as above-mentioned, does not hinder belt flexibility, including the ability for the belt to contrast to a shorter length at one longitudinal edge than the other, as is necessary to enable the belt to transverse the helical conveying path. Thus, in the preferred arrangement, the bottom of the upstanding limb of each spacer plate has a connection to the corresponding articulated link through a slot in the upstanding limb which extends along the length of the conveyor, thereby to permit a varying overlap between the adjacent spacer plates.

BRIEF DESCRIPTION OF DRAWINGS

The conveyor in accordance with the present invention is exemplified in the following description, making reference to the accompanying drawings, in which.

DESCRIPTION OF EMBODIMENTS

Figure 1:
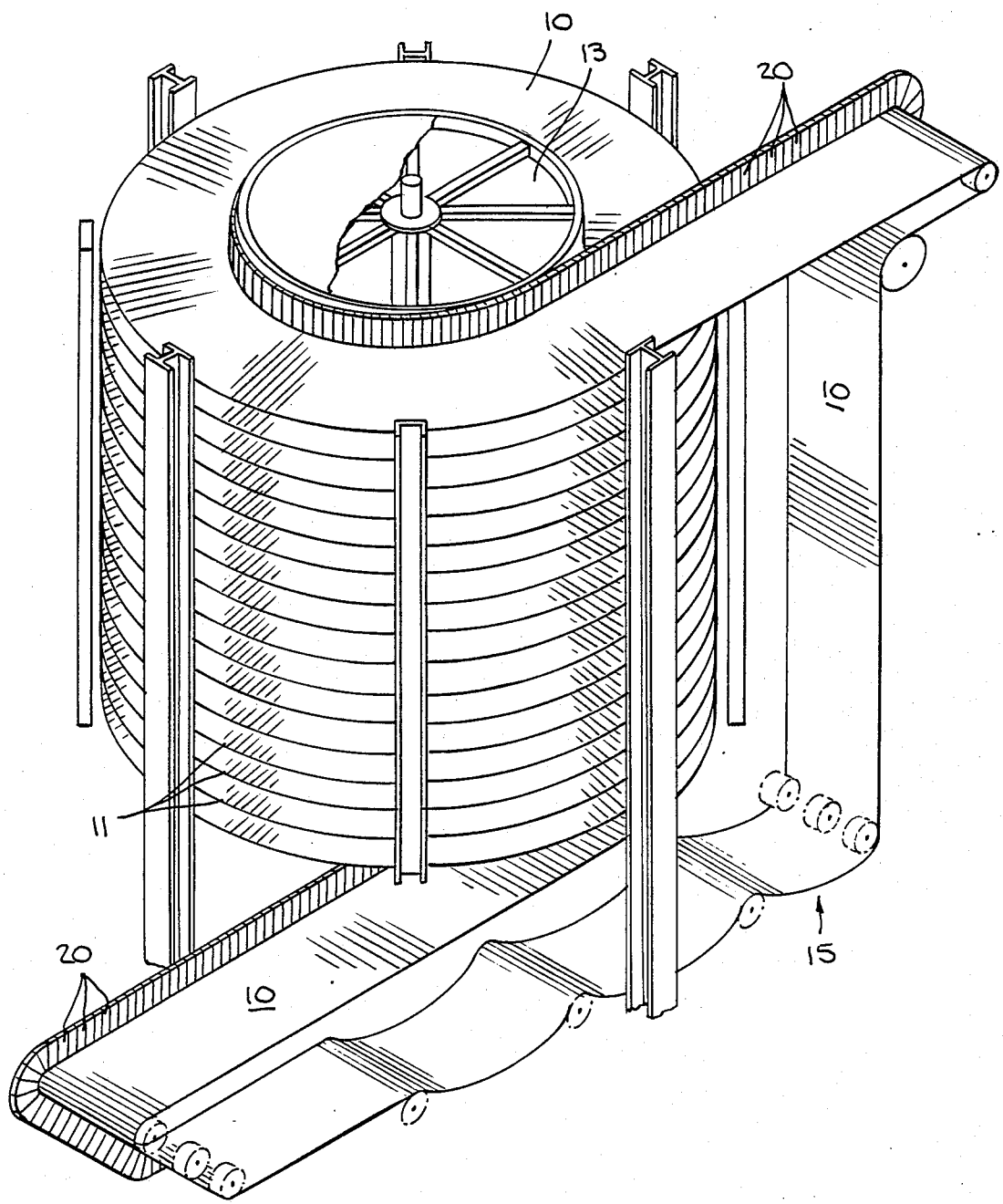
FIG. 1 is a pictorial view of a spiral conveyor in accordance with the invention.
Figure 2:
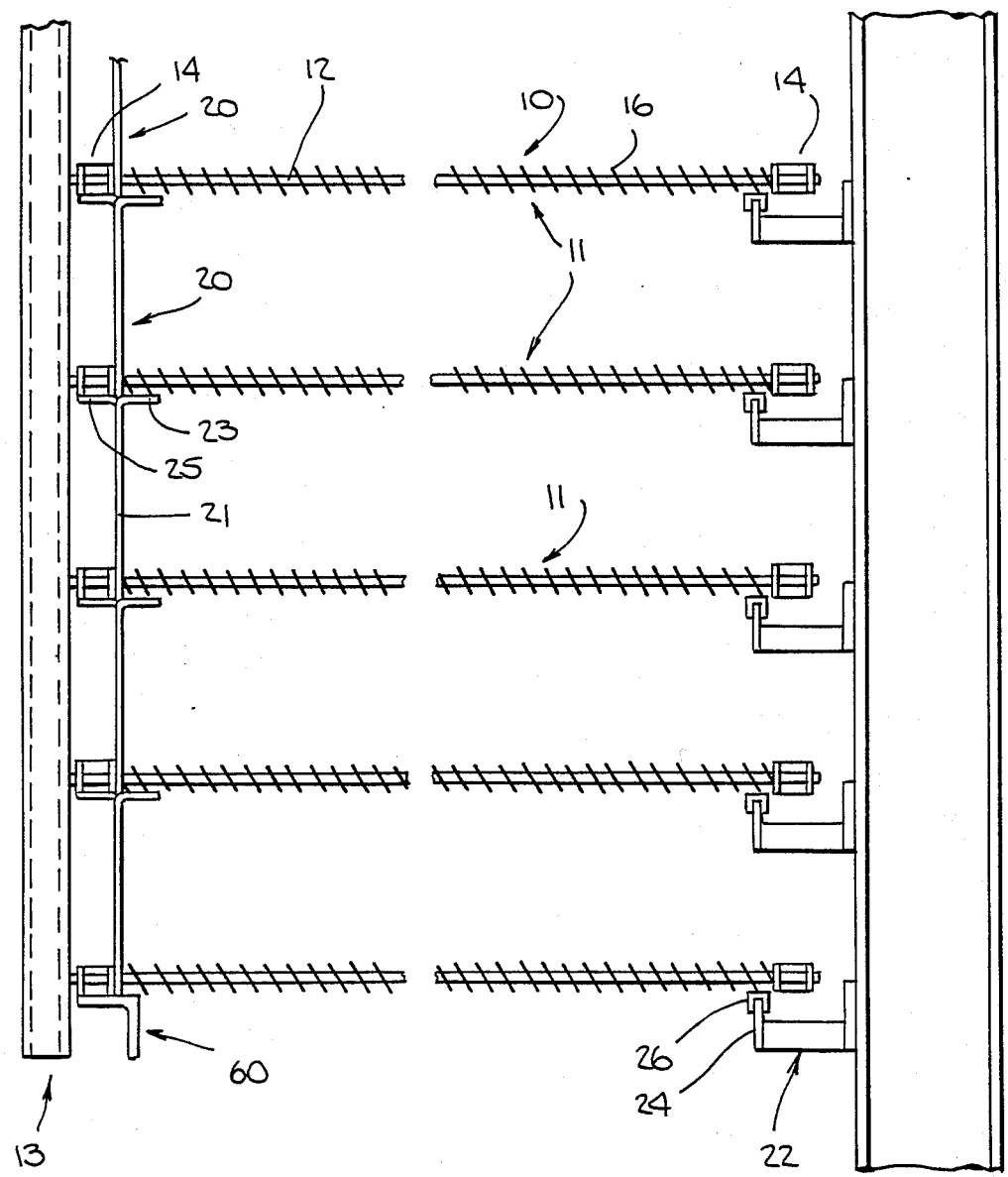
FIG. 2 is a somewhat diagrammatic view of the conveyor, when seen in elevational cross-section.
Figure 3:
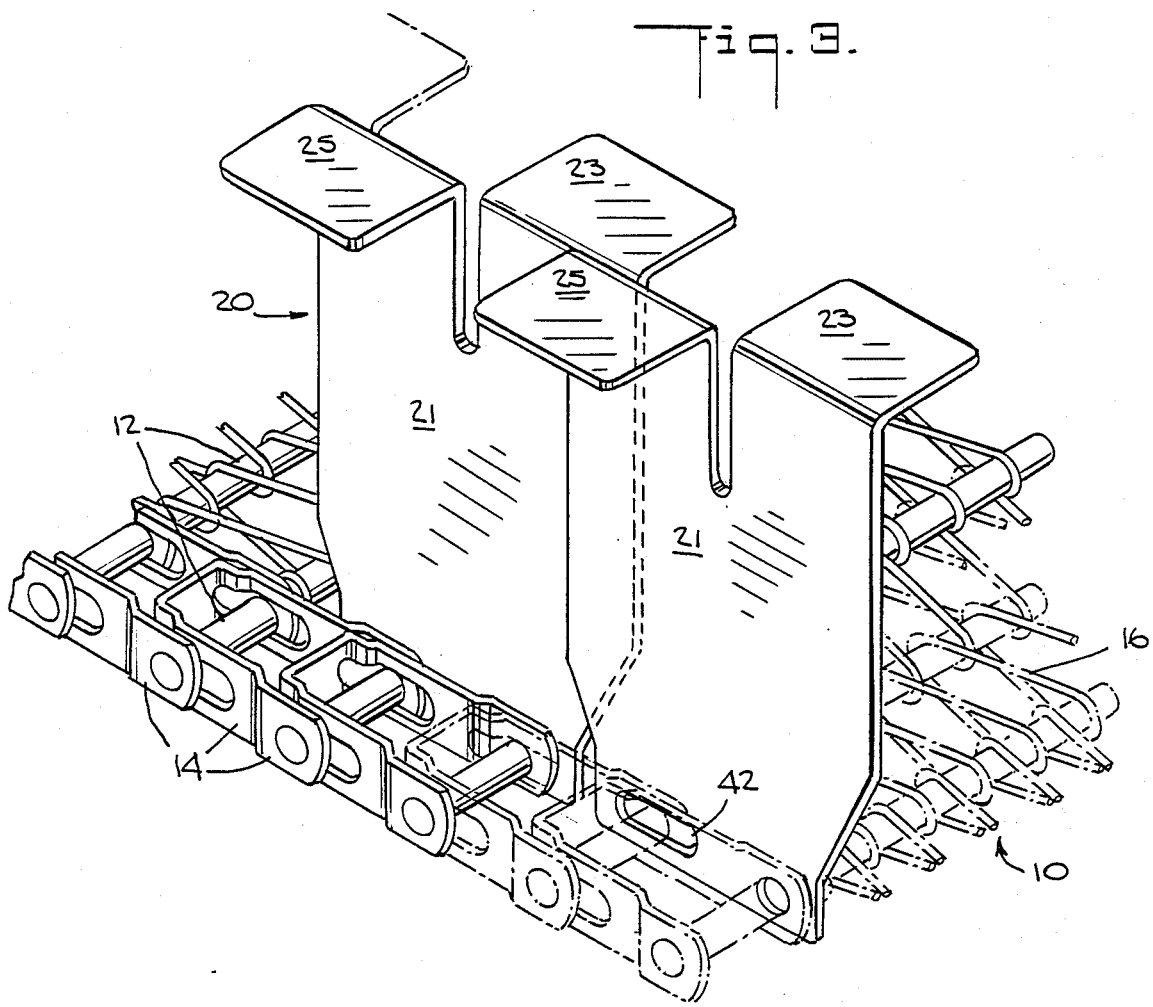
FIG. 3 shows a preferred arrangement at the inner edge of the conveyor in perspective.

Referring to FIGS. 1 to 3, reference numeral 10 denotes an Ashworth-type flexible conveyor belt. This belt, as can be seen from FIG. 3, comprises transverse rods 12 extending between articulated links 14 which form the longitudinal edges of the belt, said rods supporting a flexible wire mesh 16 which forms the surface of the belt on which in use a product is conveyed. By virtue of the articulated links 14, the belt is able to flex in such a manner that the transverse rods 12 are displaced closer together at either one longitudinal edge of the belt than at the other, and also to flex in a direction transverse to the plane of the belt. This Ashworth-type belt is thereby able to follow a relatively tortuous conveying path. FIG. 1 shows an endless Ashworth-type conveyor belt 10 whereat the belt is arranged, over a major part of its length, to follow a helical conveying path consisting of a stack of helically extending tiers 11. The stack is shown in elevational cross-section in FIG. 2.

The Ashworth-type belt is intended to be used under a tension kept below a predetermined threshold, and in the case of a helical conveying path it is known to impart the drive from an internal drum or capstan on the inside of the helix. In such a known arrangement, the belt is supported by a helically extending cantilever mounted on the outside of the helix and extending beneath the belt substantially to the inside edge of said helix. Inevitably, in order to take the full weight of the belt and the products being conveyed, the cantilever has to possess the necessary inherent mechanical strength, and thus assumes such dimensions that, allowing also for product space, the helically extending tiers of the conveyor belt must be spaced a substantial distance apart, resulting in an apparatus of substantial height for the length of the helical conveying path which is required. A known solution to this problem is to employ side walls, on a specially constructed flexible conveyor belt, which act as spacers both on the inside and the outside of the helical conveying path, thereby to render the tiers self supporting on top of one another, but this has disadvantages as outlined hereinbefore.

In accordance with the present invention, the conveyor belt 10 is self-supporting on the inside only of the helix, by means of spacer plates 20, and on the outside of the helix the conveyor belt is supported by a fixed helically extending guide 22. Because the guide 22 is required only to take part of the weight of the belt and the product, and is not required to extend across the product space, the helically extending tiers 11 of the conveyor belt 10 do not have to be spaced by a distance substantially exceeding that necessary for accommodation of the product.

The guide 22 on the outside of the helix is a lipped rail 24 provided with a plastics capping 26 on which the outer longitudinal edge of the conveyor belt 10 is supported and over which it can freely slide. As illustrated, the plastics capped rail supports the belt just inside the articulated links 14 forming the outside longitudinal edge of the belt.

For completeness, FIG. 1 shows the internal drum or capstan 13 employed frictionally to drive the Ashworth-type belt 10 with slippage, thereby to ensure that the belt tension does not exceed the prescribed threshold. The return path of the conveyor belt, from the top back to the bottom of the helical conveying path, is generally indicated by reference 15.

The spacer plates 20, provided on alternate conveyor links 14 on the inside longitudinal edge of the conveyor belt 10, may be incorporated into the belt during manufacture thereof, but alternatively added to the belt as a separate production step. As can be seen from FIG. 3, the plates 20 connect between a pair of transverse rods 12 of the conveyor belt by means of a slot 42, in the case of at least one rod, so as not to detract from the flexibility of the belt.

The preferred spacer plates 20 shown in FIG. 3 each have an upstanding limb 21 at the outside edge (nearer the centre line of the belt) of the corresponding link 14, and oppositely directed lateral limbs 23, 25 at the top, respectively directed outwardly towards and inwardly away from the centre line of the belt, these two oppositely directed top limbs 23, 25 being slightly spaced in the longitudinal direction of the belt, whilst adjacent plates overlay (in use to a somewhat varying extent) in this longitudinal direction. The limbs 23, 25 on the spacer plates of any one tier of the helical conveying path thus support the tier above both beneath the inner articulated links 14 and beneath the inner edge region of the flexible wire mesh 16 of the Ashworth-type conveyor belt (see FIG. 2).

The bottom tier of the conveyor belt 10 is supported at the inside longitudinal edge by an inclined part-circular support or ramp 60 on which the conveyor links can freely slide. This support 60 leads the conveyor belt back to the bottom of the helical conveyor path from the return path 15 (FIG. 1). The support 60 may be equipped with small rollers to assist the sliding action.

Figure 4:
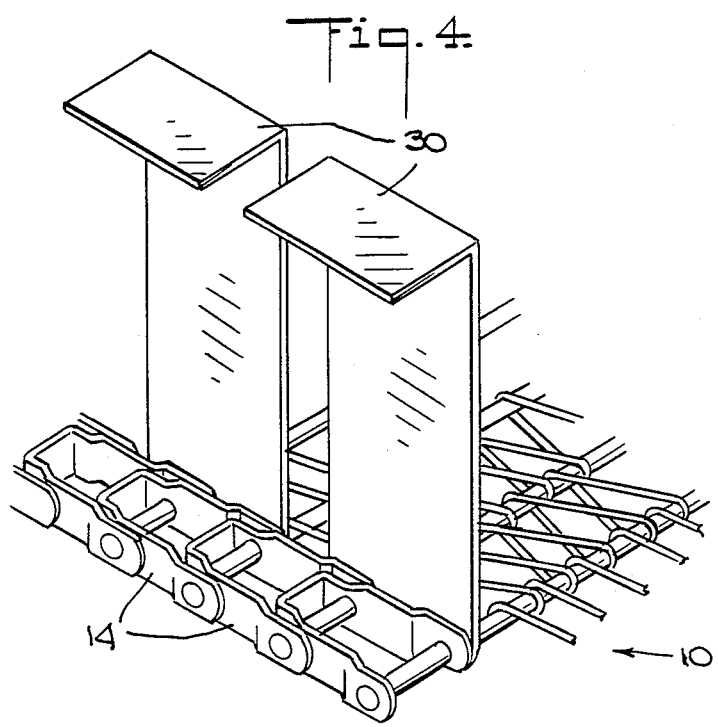
FIG. 4 shows an alternative arrangement at the inner edge of the conveyor.
Figure 5:
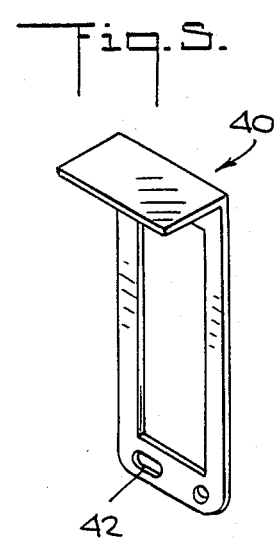
FIG. 5 shows a modified spacer plate.

The modified plates 30 and 40 shown in FIGS. 4 and 5 are of an inverted L-shape, with the transverse top limb projecting inwardly, i.e. away from the centre-line of the belt. Thus, as can be seen from FIG. 4, the spacer plates 30 and 40 upstand from the conveyor belt adjacent the inner longitudinal edge thereof, so that the links 14 of one helically extending tier are supported on the top, i.e. the transverse limb, of the spacer plates attached to the tier below. It can also be seen that the spacer plates 30 or 40 are attached to the belt on the outside of the edge links 14, so that the conveyor belt 10 can be conveniently driven by engagement of these links with the internal drum or capstan 13, a part of which is also shown in FIG. 2.

Figure 6:
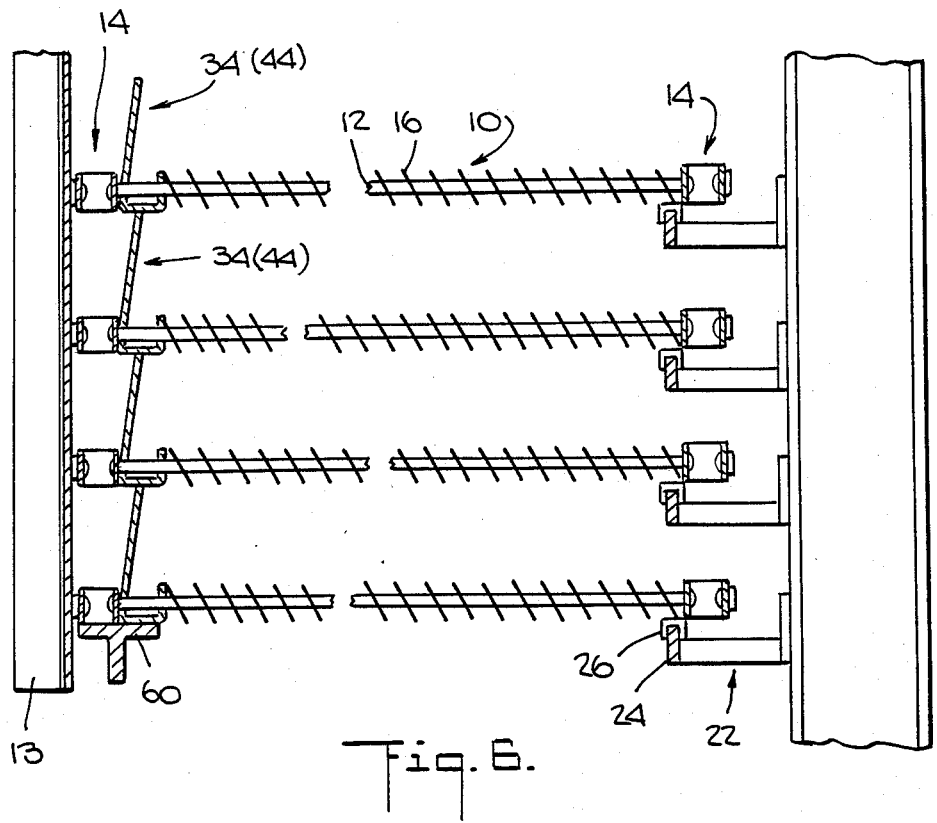
FIG. 6 is a view similar to that of FIG. 2 but showing a modification.
Figure 7:
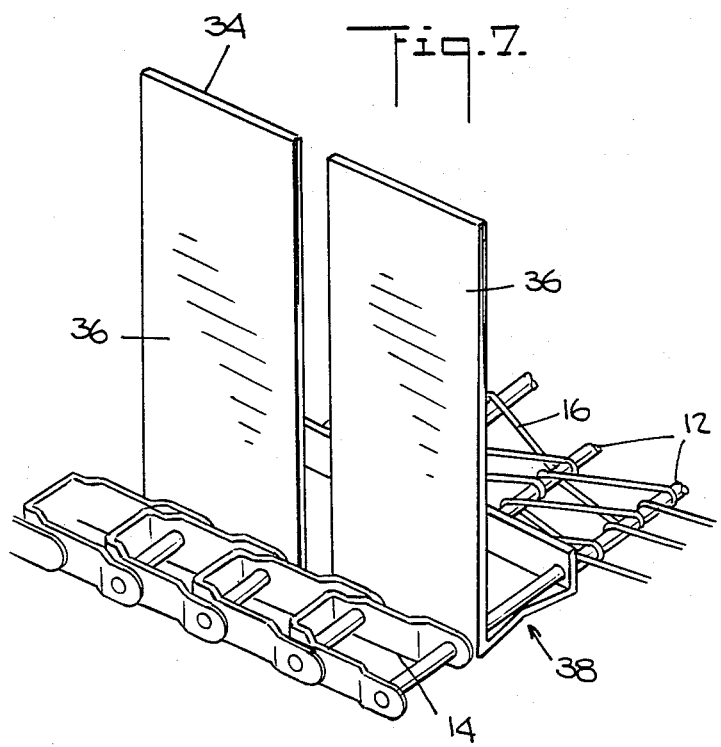
FIG. 7 shows the modified inner edge of the conveyor in perspective.
Figure 8:
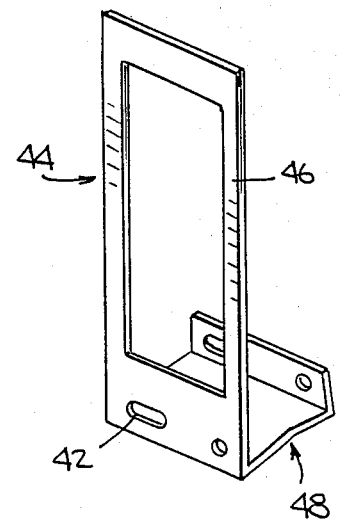
FIG. 8 shows an alternative spacer plate.

FIGS. 6 to 8 illustrate a similar conveying system wherein the same references are employed to designate corresponding parts. The system of FIGS. 6 to 8 is modified only in respect of the spacer plates. The spacer plates 34 in FIG. 7 and 44 in FIG. 8 are of a non-inverted L-shape. Moreover, the upright limb 36, 46 of the plate is slightly inclined outwardly, i.e. towards the centre-line of the conveyor belt, so that its top edge is centred into a groove 38, 48 presented on the underside of the transverse limb of a spacer plate above it. In the modified system of FIGS. 6 to 8, therefore, the spacer plates 34 or 46 of an overlying helically extending tier are supported on the top edges of the spacer plates attached to the tier below.

As indicated by FIG. 1 and previously stated, the conveyor belt 10 forms an endless path, returning by a relatively direct route from the top of the helical conveying path to the bottom thereof. This is enabled by ensuring that the attached spacer plates do not interfere with the normal flexibility of the Ashworth-type belt.

As has also previously been mentioned, it may be preferred to attach the spacer plates to the belt as a separate production step. Thus, while the drawings show the spacer plates "threaded" on to the transverse rods of the belt, it may sometimes be preferred to attach the plates via openended slots or apertures, which are subsequently closed at the open ends, as by welding or the like. The height of the spacer plates is chosen, like the angle of the helically extending guide on the outside of the helix, to suit the spacing required for product accommodation between the tiers of the helical conveying path.

In use, the conveying system is generally installed in a confined environment within which the product being conveyed is to be treated, e.g. frozen or chilled. The spacer plates shown in FIGS. 5 and 8 are apertured to assist air flow past the product in the confined treatment space, by avoiding the presentation of a solid wall on the inside of the helical conveying path. Analogous apertures may be provided in the spacer plates of the embodiments of FIGS. 1 to 3, FIG. 4 and FIG. 7.

Figure 9:
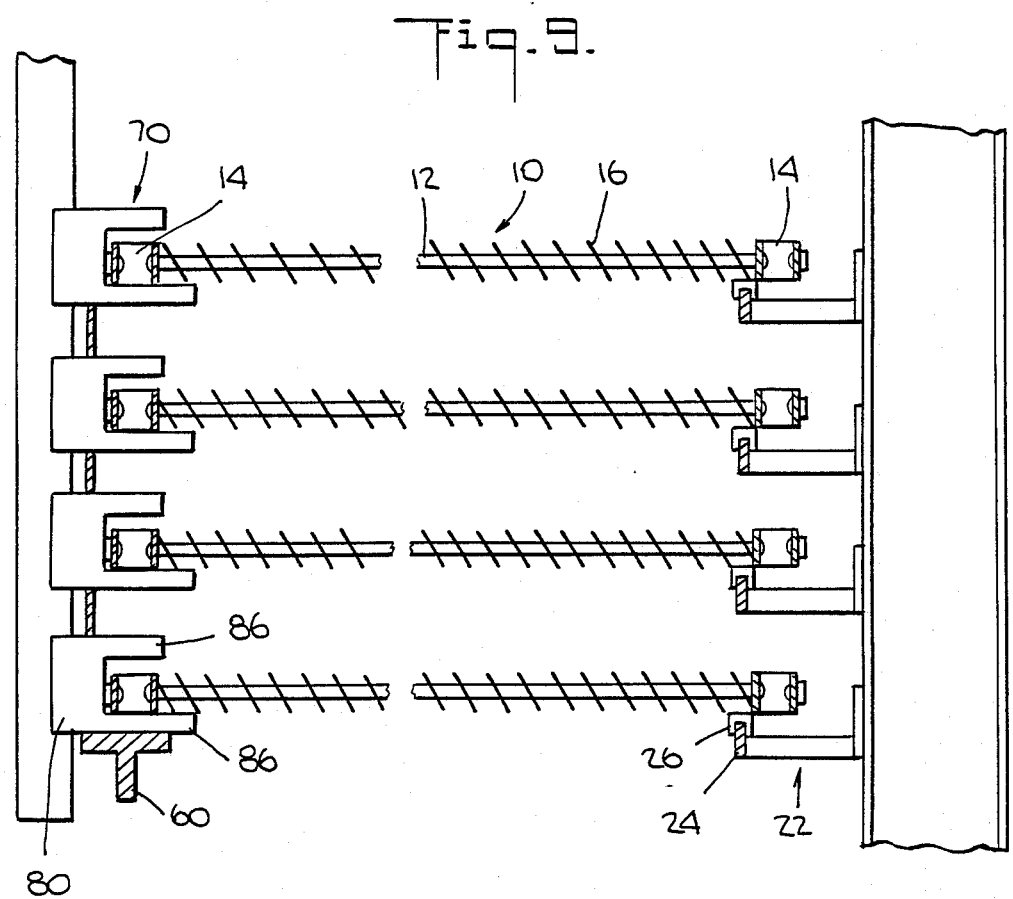
FIG. 9 shows an alternative arrangement employing a supplementary conveyor, in diagrammatic elevational cross-section.
Figure 10:
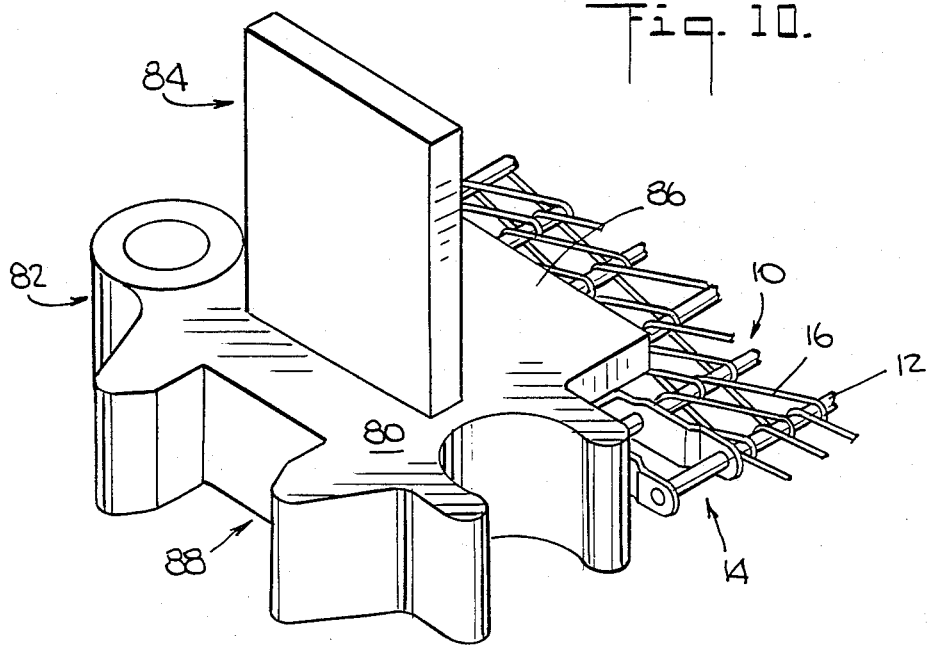
FIG. 10 is a perspective view of a supplementary conveyor link.

FIGS. 9 and 10, employing like reference numerals to FIGS. 1 to 8 for similar parts, show a different arrangement in accordance with the invention. In this arrangement, the conveyor belt 10 is supported on the inside of the helix by a helically extending supplementary conveyor generally referenced 70 and on the outside of the helix by a fixed helically extending guide generally referenced 22.

Because the guide 22 is required only to take part of the weight of the belt and the product, and is not required to extend across the product space, the helically extending tiers of the conveyor belt 10 do not have to be spaced by a distance substantially exceeding that necessary for accommodation of the product. The guide 22 on the outside of the helix is, as in the preceding arrangement, a lipped rail 24 provided with a plastics capping 26 on which the outer longitudinal edge of the conveyor belt 10 is supported and over which it can freely slide. As illustrated, the plastics capped rail supports the belt just inside the articulated links 14 forming the outside longitudinal edge of the belt.

The supplementary conveyor 70 on the inside of the helix comprises articulated links 80 moduled of high molecular weight plastics material. Each link 80, as shown in FIG. 10, comprises a base part 82 and a spacer 84. The spacer 84 supports the base part 82 of a link in the next above tier of the helically extending supplementary conveyor, so that this conveyor forms a self-supporting stack.

The base part of each link 80 of the supplementary conveyor has upper and lower flanges 86 between which the inside longitudinal edge of the Ashworth-type conveyor belt 10 is both supported and friction driven with slippage. On the opposite side to the flanges 84, 86, each link 30 has a vertical recess 88 at which it is positively driven by an internal drum or capstan (part of which is shown in FIG. 9 and is referenced 13). This drum or capstan is, as in the preceding arrangement, of a conventional kind well known in the art.

The bottom tier of the supplementary conveyor is supported by an inclined circular support or ramp 60 on which the conveyor links 30 can freely slide. As before, the circular support may be equipped with small rollers to assist the sliding action.

Both the conveyor belt 10 and the supplementary conveyor 70 providing support and drive for the belt on the inside of the helix form an endless path, returning by a relatively direct route from the top of the helical conveying path to the bottom thereof. This is enabled, in the case of the supplementary conveyor, by articulating the links 80 thereof for relative movement, at least to a limited extent, about each of two mutually perpendicular pivot axes.

For simplicity and economy of production, the supplementary conveyor is preferably fabricated as a length of articulated base parts 82, slotted or otherwise adapted to receive separately moulded spacers 84, fixed to the base parts by welding or solvent adhesive. Manufacture of the supplementary conveyor can thus be substantially standardised, spacers of appropriate height being selected to suit the spacing required between the tiers of the helical conveying path.

Various modifications of the above-described and illustrated arrangement are possible within the scope of the invention as defined in the appended claims.

I claim:

1. An endless conveyor having a conveyor belt, a portion of the length of which is caused to follow a helical conveying path comprising a plurality of tiers stacked on top of one another, including a fixed helical guide supporting the outside edge of the conveyor belt on the helical conveying path, and the inside edge of the conveyor belt being supported one on top of one another by an arrangement which includes articulated links, at least some of which are equipped with spacers in the form of upstanding plates, the tops of which, at any one tier, engage the underside of the links or plates associated with the next tier above, whereby the tiers are supported one on the other, and means whereby the inside edge of the conveyor is driven from an internal drum or capstan.

2. An endless conveyor according to claim 1, wherein the conveyor belt is a flexible mesh steel belt having articulated links, at least along its longitudinal edge on the inside of the helical conveying path, the spacer plates being so connected to the articulated links as to leave the flexibility of the belt substantially unaffected.

3. An endless conveyor according to claim 1, wherein the spacer plates are upstanding from the outer edges of the articulated links, which is on the side of said links nearer to the centre line of the conveyor belt.

4. An endless conveyor according to claim 1, wherein the spacer plates each comprise an upstanding limb and at least one transverse limb at the top extending at right angles to the upstanding limb towards or away from the centre line of the conveyor belt.

5. An endless conveyor according to claim 4, wherein each spacer plate has two transverse limbs at the top of the upstanding limb, one projecting towards the centre line of the conveyor and one away from the centre line, the said two transverse limbs being non-aligned along the length of the conveyor belt.

6. An endless conveyor according to claim 5, wherein the upstanding limbs of any two adjacent spacer plates, together with the adjacent, but oppositely directed transverse limbs of the respective plates at the tops of the upstanding limbs, overlap in the direction of the length of the conveyor.

7. An endless conveyor according to claim 6, wherein the bottom of the upstanding limb of each spacer plate has a connection to the corresponding articulated link through a slot in the upstanding limb which extends along the length of the conveyor, thereby to permit a varying overlap between the adjacent spacer plates.

* * * * *